United States Patent [19]
Friedrich

[11] Patent Number: 5,957,366
[45] Date of Patent: Sep. 28, 1999

[54] HELICALLY FORMED WELDED PIPE AND DIAMETER CONTROL

[75] Inventor: Ralph S. Friedrich, Hermosa Beach, Calif.

[73] Assignee: Ameron International Corporation, Pasadena, Calif.

[21] Appl. No.: 08/957,963

[22] Filed: Oct. 21, 1997

[51] Int. Cl.$^6$ .............. B23K 11/08; B23K 37/00
[52] U.S. Cl. .............. 228/102; 228/9; 228/17.7; 228/145; 219/62
[58] Field of Search .............. 228/9, 17.7, 102, 228/145; 219/62

[56] References Cited

U.S. PATENT DOCUMENTS

| | | | |
|---|---|---|---|
| 3,024,348 | 3/1962 | Cavel | 219/62 |
| 3,208,138 | 9/1965 | Eckhardt | 228/17.7 |
| 3,239,122 | 3/1966 | Berkeley | 228/15 |
| 3,383,488 | 5/1968 | Bandura et al. | 219/62 |
| 3,601,570 | 8/1971 | Davis | 219/62 |
| 3,726,463 | 4/1973 | Hoffman et al. | 228/15 |
| 3,857,162 | 12/1974 | Hoffman et al. | 228/9 |
| 3,905,536 | 9/1975 | Claussen | 228/9 |
| 4,621,974 | 11/1986 | Krueger | 414/786 |
| 4,952,769 | 8/1990 | Acheson | 219/76.14 |
| 5,180,095 | 1/1993 | Orth | 228/9 |
| 5,325,693 | 7/1994 | Hoffmann et al. | 72/19 |
| 5,435,867 | 7/1995 | Wolfe et al. | 156/171 |
| 5,573,056 | 11/1996 | Feichtinger et al. | 164/46 |
| 5,598,780 | 2/1997 | Marmin et al. | 101/415.1 |

FOREIGN PATENT DOCUMENTS

1599170 A1 10/1990 U.S.S.R. .............. 228/102

OTHER PUBLICATIONS

Soviet Union Patent Abstract, Patent No. 555935, Publication Date May, 1977.

*Primary Examiner*—Patrick Ryan
*Assistant Examiner*—Jeffrey T. Knapp
*Attorney, Agent, or Firm*—Christie, Parker & Hale, LLP

[57] ABSTRACT

A helical weld servo controller for controlling the diameter of helically formed welded pipes adjusts the auxiliary hold down wheel position and the helix angle based on information provided by transducers regarding outgoing pipe diameter and by a laser vision device which generates weld gap and offset information.

18 Claims, 5 Drawing Sheets

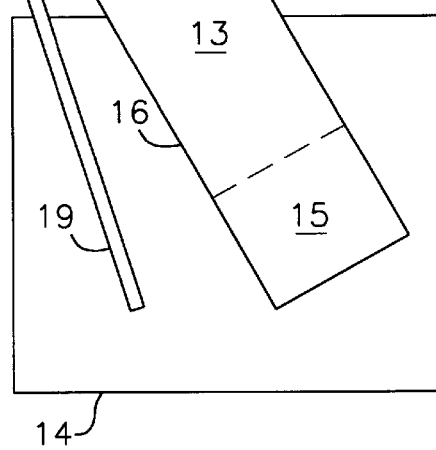
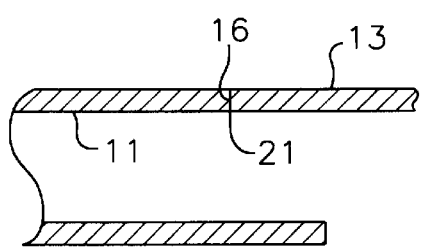
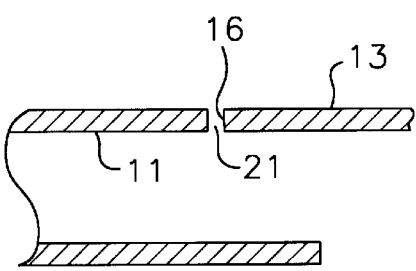
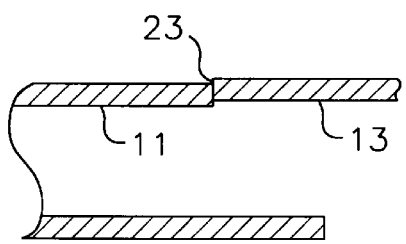

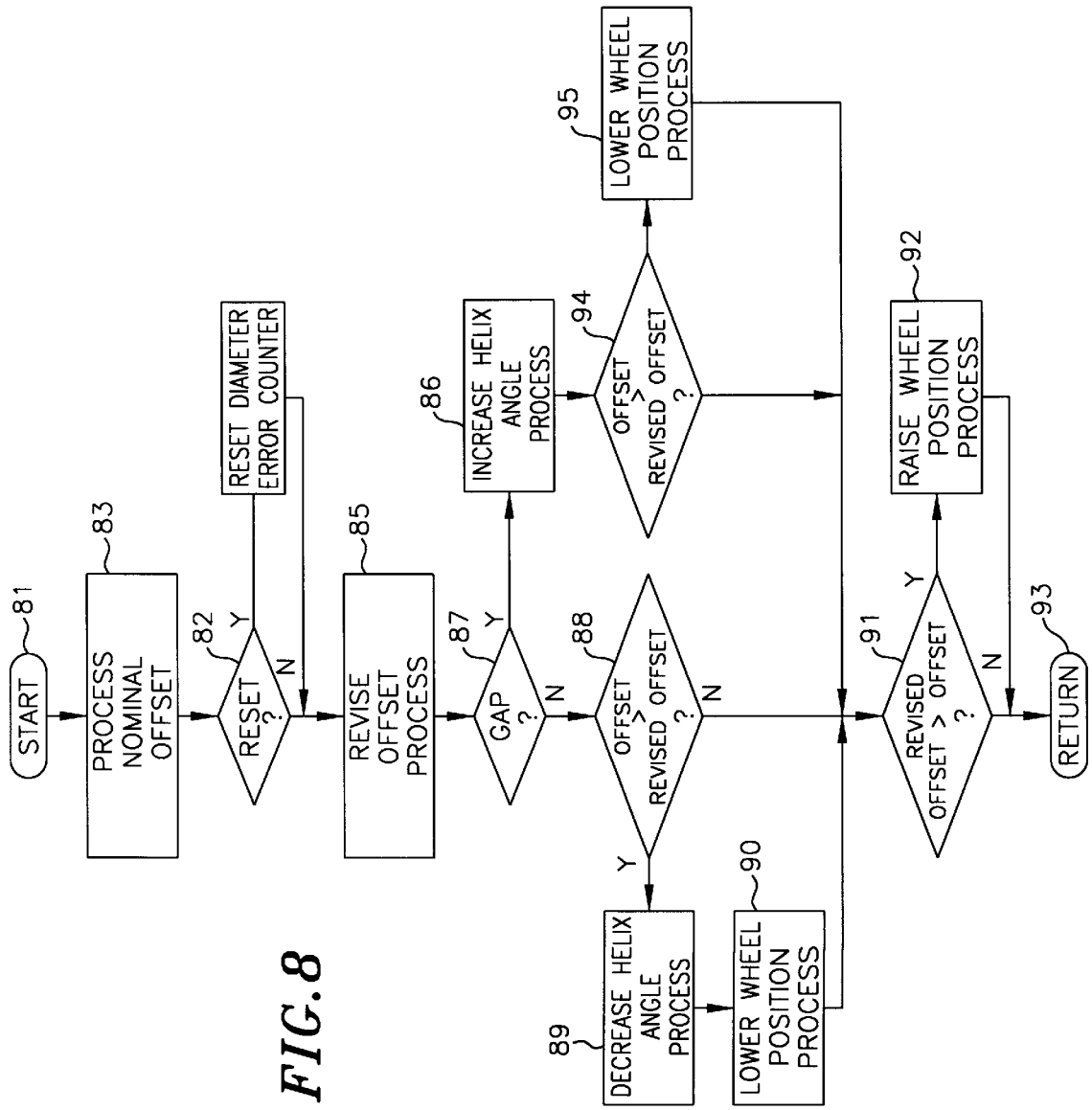

５,９５７,３６６

HELICALLY FORMED WELDED PIPE AND DIAMETER CONTROL

FIELD OF THE INVENTION

The present invention relates to helically formed welded pipes. The present invention specifically relates to means for controlling the diameter of a helically formed welded pipe.

BACKGROUND OF THE INVENTION

A well known method of making steel pipe is to helically weld steel skelp. Steel skelp is an elongated metal sheet, and is usually provided in large coiled rolls. The sheet is continuously fed to a pipe former where the sheet is helically wound into the form of a pipe and the edges of the sheet are welded together. The preferred weld is a butt weld, with one edge of the sheet abutting the opposing edge of a portion of the sheet already formed in the shape of a pipe. As a practical matter, the edges of the metal sheet are welded together as the shape of the pipe is formed. In order to form a helical pipe, the sheet has to be fed to the pipe former in a direction at an angle to the axis of the formed pipe. This angle is generally referred to as the helix angle. The width of the sheet, the helix angle, and the distance of the sheet from the axis of the pipe determine the diameter of the pipe.

Problems in the manufacture of pipe using such a method may occur due to irregularities in the steel skelp. Steel skelp is not a precision product. The width of the skelp may change throughout the length of the coil. The unrolled skelp also may not be perfectly linear, the skelp often contains camber which causes it to curve in a snake-like fashion. Camber and sheet width changes increase the difficulty in maintaining pipe diameter and also cause problems in the welding together of the sheet edges. Welding blowthrough may occur if there is a gap between the abutting edges of the sheet at the point of welding, even if the gap is slight. Eliminating the gap between the sheet edges as they are being welded avoids the problem of welding blowthrough.

Methods to minimize weld gaps are known. One method is to shear the edges of the skelp coil to a constant width in a manner that eliminates most of the camber. This method, however, results in a material loss of approximately 3 percent. Another method is to determine the extent of the gap, if any, between abutting edges of the sheet. If a gap is detected, the helix angle is adjusted to close the gap. The leading edge of the incoming sheet, however, may also be offset radially from the pipe. The edges of the sheet may exhibit offset because the incoming section of the sheet to the weld point is not properly aligned. The offset may also occur because the edges of the sheet are being pressed together with undue pressure at the weld point. Such undue pressure generally causes the incoming sheet to climb or move radially outwardly with respect to the formed pipe, resulting in offset. The extent of the offset can be monitored and the helix angle adjusted to eliminate the offset. Doing so, however, may have unintended consequences with respect to pipe diameter. Therefore, it is desirable to minimize weld gap problems and offset, yet still maintain correct pipe diameter.

SUMMARY OF THE INVENTION

The present invention provides an apparatus and method for controlling pipe diameter of pipe formed by helically welding a steel strip. Transducers are placed adjacent to the pipe downstream from a welding location for measuring pipe diameter and a servo control controls the offset and helix angle of an incoming strip relative to the axis of the pipe in response to information from the transducers. Additionally, the servo control adjusts the incoming angle of the steel sheet in response to weld gap information provided by weld gap measuring means.

The present invention thereby provides an apparatus and method for controlling the diameter of a pipe while also providing weld gap control. The intended features of this invention will be more readily appreciated as the same becomes better understood by reference to the following detailed description when considered in connection with the accompanying drawings in which like reference symbols designate like parts throughout.

DESCRIPTION OF THE DRAWINGS

FIG. 1 illustrates schematically a helically formed welded pipe being formed from a sheet of skelp;

FIG. 2A is a longitudinal cross-sectional view of a helically formed welded pipe showing the preferred relationship between the edge of the incoming sheet and the pipe at the weld point;

FIG. 2B is a longitudinal cross-sectional view of a helically formed welded pipe exhibiting a weld gap at the welding point;

FIG. 2C is a longitudinal cross-sectional view of a helically formed welded pipe exhibiting offset at the welding point;

FIG. 8 illustrates a flow diagram of the control means of the present invention.

DETAILED DESCRIPTION OF THE INVENTION

Figure 3A:
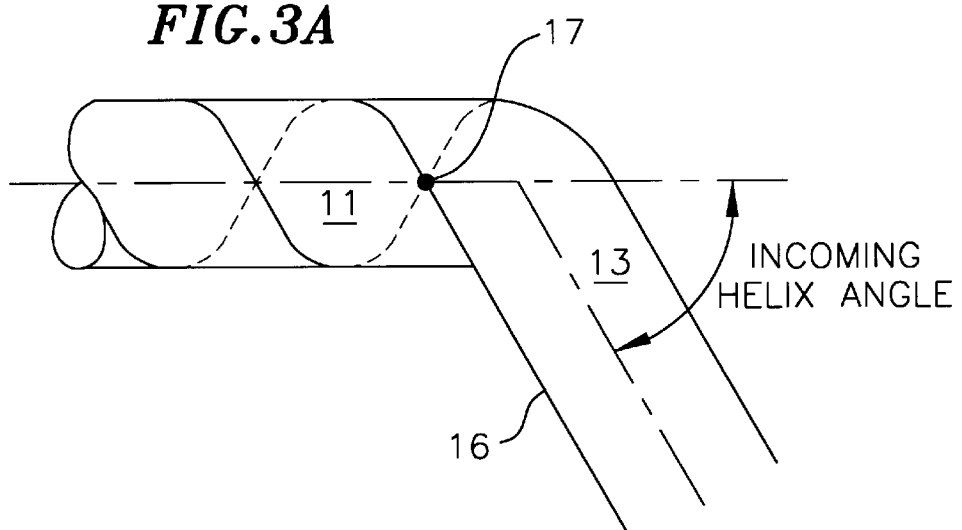
FIG. 3A illustrates a helically formed welded pipe.

FIG. 1 shows schematically a pipe 11 being formed from an incoming sheet 13 of skelp stored in a coil 15. A pivoting feed frame 14 allows adjustment of the angle at which the incoming sheet approaches the pipe. A guide fence 19 aids in guiding the sheet onto the pipe. A leading edge 16 of the sheet is welded to the already welded pipe at a weld point 17. The pipe rotates as additional lengths of the sheet are fed to the weld point, thus forming a pipe. An off bearing table 12 positions the pipe as it is being formed. The off bearing table also is pivotable and also allows for adjustment of the angle at which the pipe receives the incoming sheet. In the present embodiment the feed frame is held in a fixed position, and the off bearing table is used to control the angle between pipe axis and the incoming sheet. Alternatively, the feed frame, or a combination of both the off bearing table and the feed frame, could be used to provide angle control. Such apparatus for helically welding pipe is conventional.

FIG. 2A is a schematic longitudinal cross-sectional view showing the leading edge of the incoming sheet 11 abutting the edge of the pipe 13 at the weld point 16. This is the preferred relationship between the position of the leading edge of the incoming sheet and the pipe edge at the weld point. FIG. 2B is a sectional view showing the leading edge of the incoming sheet and the pipe at the weld point exhibiting a weld gap 21. The weld gap which is the gap between the leading edge of the incoming sheet and the edge of the outgoing pipe. The weld gap is eliminated by forcing the leading edge of the incoming sheet to abut the outgoing pipe at the weld point. If the incoming sheet is pressed too tightly against the outgoing pipe, however, the incoming sheet tends to climb, or rise, relative to the outgoing pipe. This climbing or rising results in an offset 23 shown in FIG. 2C. The offset results in the pipe diameter changing by double the amount of the offset for every revolution of the pipe.

FIG. 3A illustrates a pipe being formed with no weld gap or offset present. The angle formed by the axis of the pipe and the incoming sheet, which is less than 90° as shown, is referred to as a helix angle. The helix angle, in conjunction with the width of the sheet and any offset, determines the diameter of the pipe.

Figure 3B:
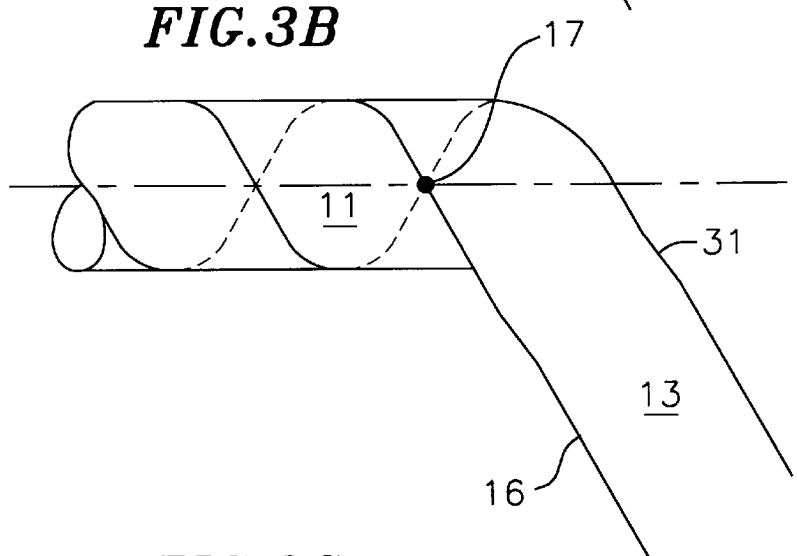
FIG. 3B illustrates a helically formed welded pipe and an incoming sheet exhibiting camber.

FIG. 3B illustrates a pipe being formed with an incoming sheet that has a camber 31. The camber illustrated results in the helix angle increasing at the weld point. If the helix angle is not adjusted, the camber in the incoming sheet will result in a weld gap. If the camber were in the opposing direction, the abutting edges of the sheet would be forced tightly together resulting in offset.

Figure 3C:
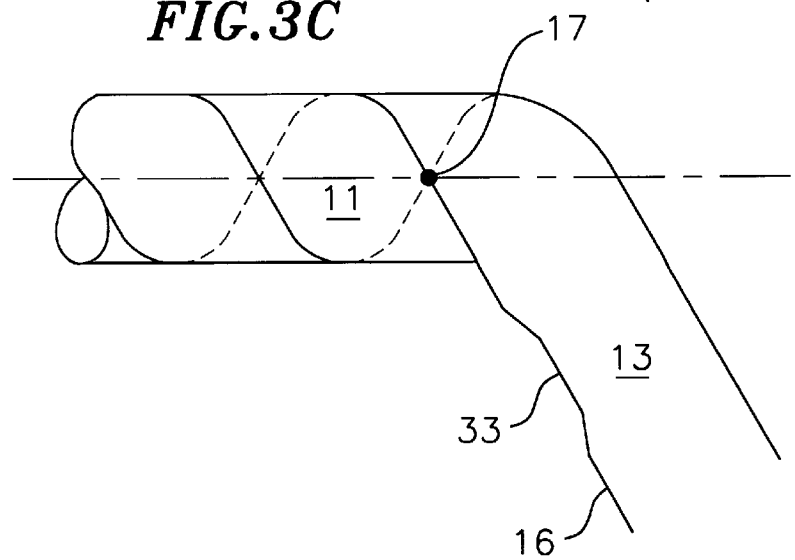
FIG. 3C illustrates a helically formed welded pipe and an incoming sheet exhibiting a decrease in sheet width.

FIG. 3C shows a decrease 33 in the width of the incoming sheet, with the decrease being on the leading edge of the sheet. The decrease in width of the incoming sheet results in an effective decrease in the helix angle where the width of the sheet is decreasing, which results in a weld gap. If the width of the incoming sheet were increasing, the incoming helix angle would effectively increase at the weld point and would result in offset if not corrected.

The above figures discuss the operation of an over slung helical pipe welding machine. As can be seen in FIG. 1, the incoming sheet edge is welded to the pipe near the top of the pipe in an over slung machine. Under slung helical pipe welding machines are also known. In an under slung helical pipe welding machine the incoming sheet is welded to the pipe near the bottom of the pipe. The under slung machine also uses an invert roller instead of an auxiliary hold down wheel. The invert roller is largely the functional equivalent of the auxiliary hold down wheel. The invert roller, however, can be positioned directly under the weld point, and may simultaneously contact both the incoming sheet and the outgoing pipe. Even when the invert roller simultaneously contacts both surfaces, another type of offset occurs when the invert roller bends the outgoing trailing edge of the pipe upward in the vertical direction, and thereby effecting a diameter change. Thus, although the present invention is discussed with respect to an over slung helical pipe welding machine, the present invention is equally applicable to under slung helical pipe welding machines as well.

Figure 4:
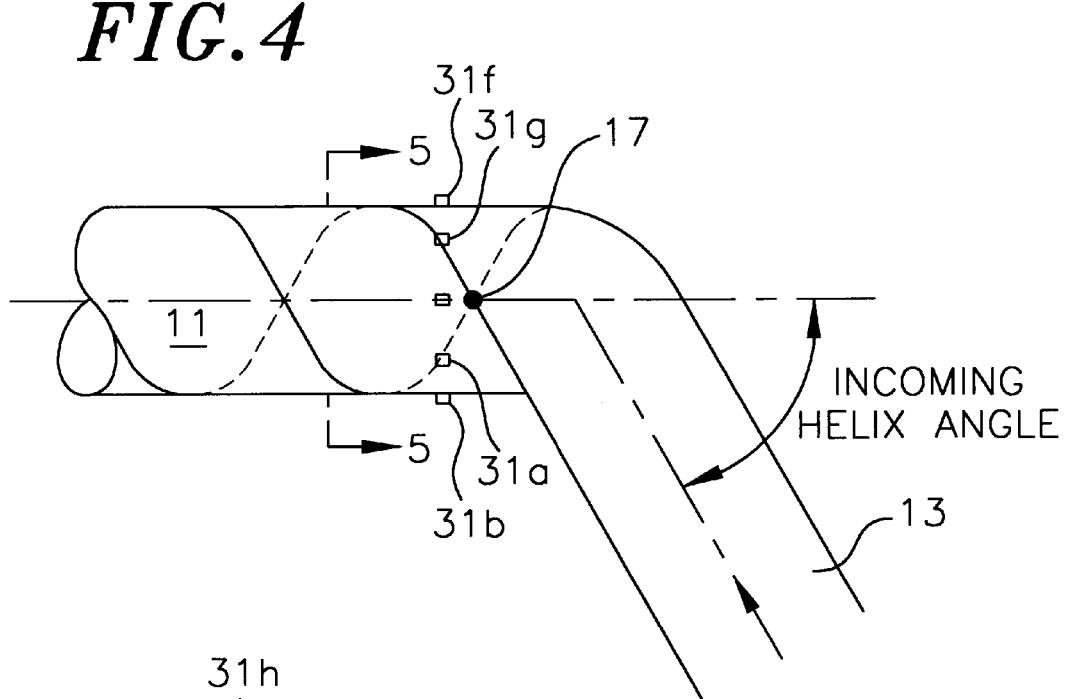
FIG. 4 illustrates a helically formed welded pipe with a set of linear transducers.

FIG. 4 illustrates a pipe being formed by the welding of an incoming sheet at the weld point. A set of linear transducers 31a–h (LVDTs, for example) are located slightly downstream from the weld point. The transducers are substantially adjacent to the outgoing pipe. The transducers provide information as to the diameter of the outgoing pipe. Non-contact transducers may also be used.

Figure 5:
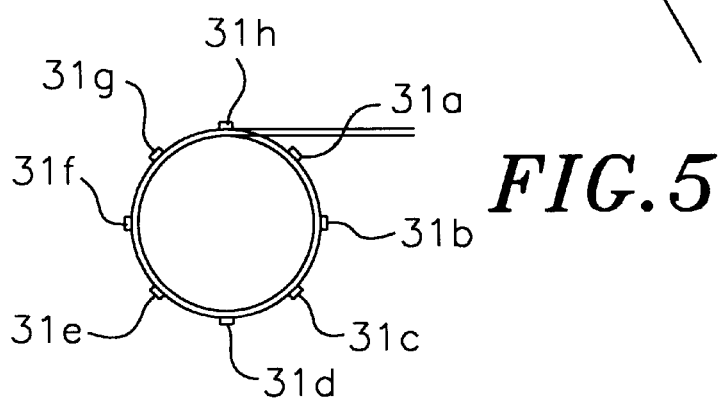
FIG. 5 illustrates an end view of the helically formed welded pipe and transducers of FIG. 4.

As seen in FIG. 5, four pairs of transducers are used to provide accurate information relating to pipe diameter. Because the transducers are not located along the pipe at the weld point, the information provided by the transducers is slightly delayed with respect to the pipe diameter as it is being formed. This delay is not believed to be significant in the present embodiment. However, in some applications it may be desirable for the control system later described to adjust and make allowance for this delay.

Figure 6:
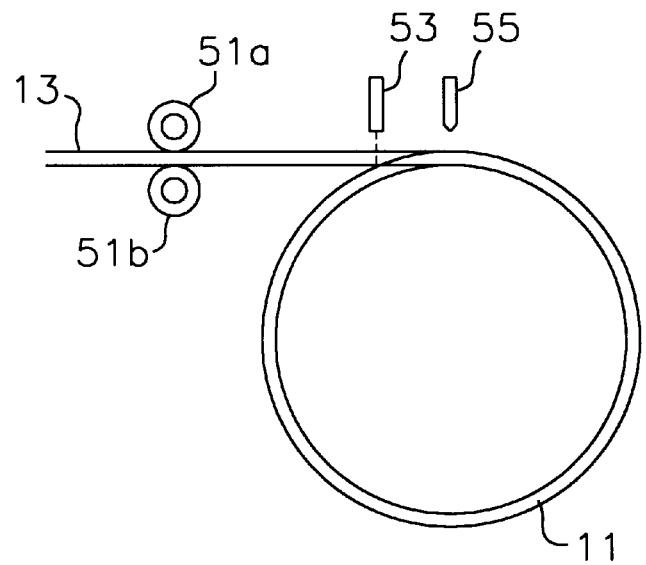
FIG. 6 illustrates a helically formed welded pipe with an incoming sheet guide, laser, and welding head.

FIG. 6 illustrates a pipe being formed from an incoming sheet with no offset. An incoming sheet is guided into position by an upper guide roller 51a and a lower guide roller 51b. The curvature of the pipe as it is formed naturally tends to force the incoming sheet upward (that is in an outward radial direction). Therefore, the lower guide roller is generally not necessary. Thus only the upper roller is often used, and the upper roller is often referred to as an auxiliary hold down wheel.

A gap laser vision device 53 is located above the edge of the pipe and the leading edge of the incoming sheet at a point substantially adjacent, but prior to, the weld point. The gap laser vision device is coupled to a controller, such as a computer executing software, all of which is available from Modular Vision Systems Inc. Of Montreal, Canada. The gap laser vision device determines the gap between the incoming sheet and the pipe. An offset laser vision device 55, also available from Modular Vision Systems Inc., and which is also connected to the controller, determines the amount of offset between the pipe and the incoming sheet. The offset laser vision device is positioned slightly prior to the welding point. Therefore, the offset laser vision device does not see the actual offset between the pipe and the incoming sheet, but instead sees an offset somewhat greater than the actual offset by a constant value. Thus, the actual offset is determined by subtracting the constant value from the offset as determined by the offset laser vision device.

Figure 7:
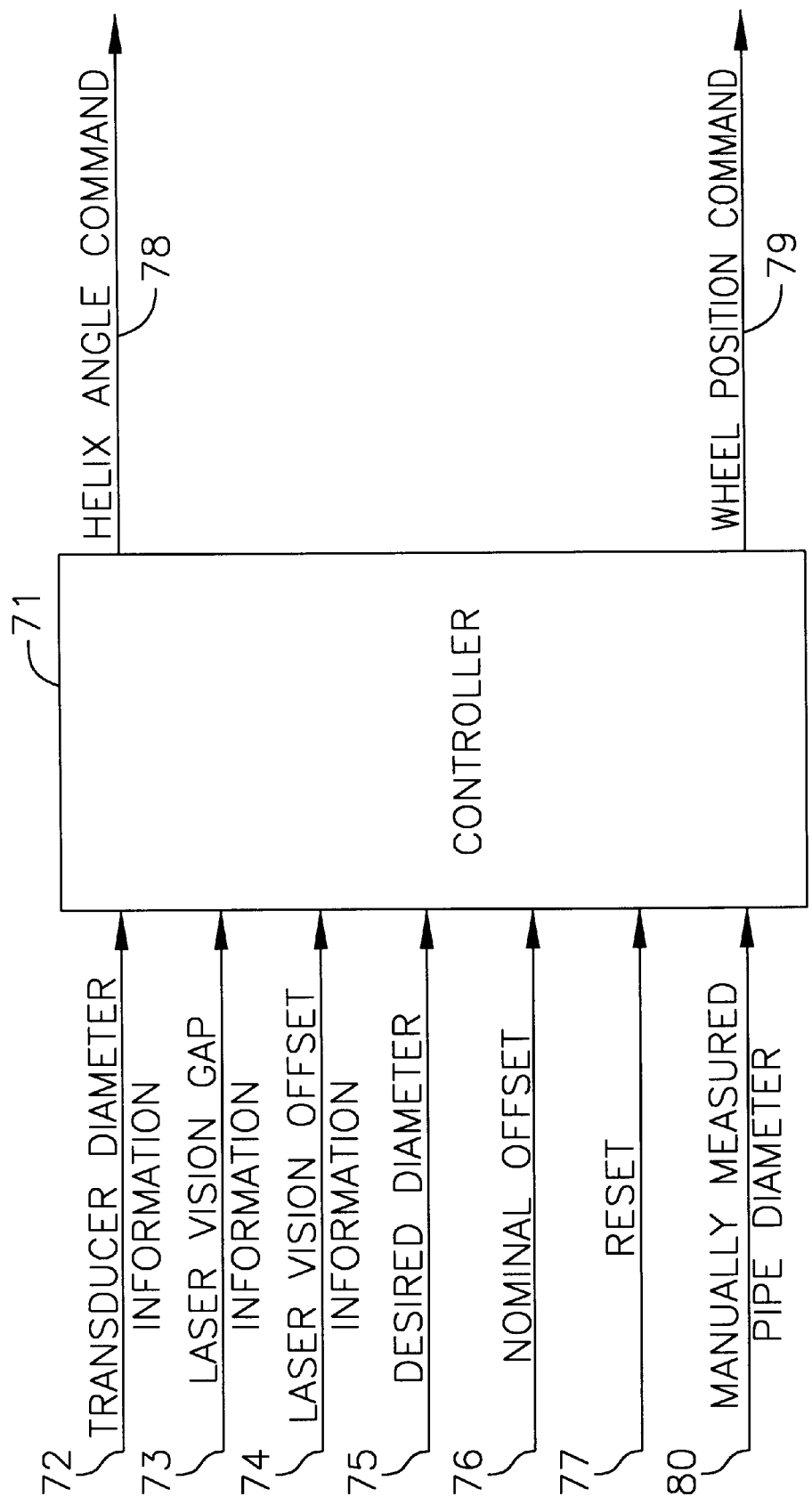
FIG. 7 illustrates a block diagram showing the inputs and outputs to a controller.

The transducers and the laser vision devices are coupled to a controller 71. FIG. 7 illustrates the inputs and outputs to the controller. The controller is provided pipe diameter information 72 from the transducers and weld gap information 73 and offset information 74 from the laser vision devices. The controller is also provided the desired pipe diameter 75, a nominal expected offset 76 at the laser vision devices, a reset command input 77 and a manually measured pipe diameter 80. Based on these inputs, the controller determines the helix angle and auxiliary hold down wheel position commands.

FIG. 8 is a flow chart of a control process executed by the controller. Although the flow chart indicates a sequential execution of program elements, it should be recognized that some elements of program execution may occur in parallel, or even in multiple processors. As described in the flow chart of FIG. 8, the controller processes 83 the nominal offset. The nominal offset is the expected amount of offset seen by the laser vision device during correct system behavior, and may be estimated or experimentally determined. The nominal offset value is entered into the controller by the operator. If the controller is a computer coupled to a display screen and a keyboard, this may be done by requesting the nominal offset value from the operator and then allowing for entry of such by the operator.

After the nominal offset has been processed, the controller determines 85 a revised offset value. The revised offset value is generally the nominal offset plus the difference between the desired diameter and the actual diameter as measured by the transducers. In the embodiment described, the revised offset is, in the absence of a reset command, a function of the nominal offset and the difference between the diameter as measured by the transducers and the desired diameter.

The revised offset is determined by first subtracting the desired diameter from the measured diameter to determine the diameter error. Thus, if the measured diameter is greater than the desired diameter, the diameter error is positive, and if the measured diameter is less than the desired diameter, the diameter error is negative. The diameter error is adjusted by a constant scaling factor. The adjusted diameter error is subtracted from the nominal offset to determine the revised offset. Making the scaling factor a function of the thickness of the incoming sheet and the desired diameter of the pipe will, for most applications, provide the desired system response for all combinations of pipe diameter and thickness when helix angle and offset roller commands are based, at least in part, on the magnitude of the revised offset. Further control of system response may be provided by additionally utilizing separate scaling factors for each of the increase helix angle, decrease helix angle, lower offset roller, and raise offset roller commands. Additionally, the offset roller may adjust pipe diameter at a significantly faster rate when a gap exists between the pipe and the incoming sheet. Therefore, separate scaling factors may be used for offset roller commands depending on whether a gap is present, with a scaling factor having a larger magnitude used when a gap is present.

The controller also determines 82 if a reset is commanded. The reset is commanded through the pressing of a button or other means. When a reset is commanded, the controller sets 82a the diameter error to a value equal to the manually measured pipe diameter minus the desired pipe diameter. The manually measured pipe diameter is input to the controller through a keyboard or other means. The controller also thereafter adjusts the transducer measured pipe diameter for any difference between the manually measured pipe diameter and the transducer derived measured pipe diameter. The reset function therefore provides for correction of errors in the transducer determined pipe diameter and provides for calibration of the transducer derived pipe diameter measurements.

The controller also determines 87 whether a weld gap exists. The determination may be done in parallel with the revised process or sequentially as shown in FIG. 8. If a weld gap exists, the controller commands an increase in helix angle to close the weld gap. Weld gap control in this manner is known in the art, and is available from Modular Vision Systems Inc. If the controller determines that no gap exists, the controller compares the current offset as determined by the laser vision device with the revised offset value. If the current offset is greater than the revised offset value, the controller decreases the helix angle. It is important to note that the presence of a weld gap causes difficulties greater than those provided by an offset between an incoming sheet and a pipe. Therefore, if a gap is present, the controller will always increase the helix angle, and the helix angle will not be decreased due to the offset being greater than the revised offset value. If the offset is greater than the revised offset value, the controller also commands 90, 95 the auxiliary hold down wheel to lower its position. If the offset is less than the revised offset value 91, the controller commands 92 the auxiliary hold down wheel to raise its position. As an excess in pressure between the edge of the pipe and the edge of the incoming sheet generally causes the incoming sheet to climb, or to increase the offset, an offset lower than the revised offset value indicates that the helix angle is correct although the auxiliary hold down wheel position is not. Therefore, adjusting only the auxiliary hold down wheel should provide a sufficient response.

In practice, therefore, if the current pipe diameter is correct, the incoming sheet has no camber, and the sheet width is constant, the controller should effect no change and the pipe with the desired diametric characteristics is produced. If, however, the current diameter is too small, the incoming sheet has no camber, and the sheet width is constant, the controller responds by calculating the revised offset value and commanding an increase in the height of the auxiliary hold down wheel in order to effect a diameter change. The rising auxiliary hold down wheel will raise the incoming sheet, resulting in offset. The pipe diameter, therefore, increases. If a weld gap occurs during this process, the controller commands an increase in helix angle while the auxiliary hold down wheel will continue to increase the diameter of the pipe. It is largely irrelevant that the controller cannot determine if the increasing offset is caused by the increasing height of the auxiliary hold down wheel, and therefore an increase in height in the incoming sheet, or if the sheet is climbing from an excess of pressure between the leading edge of the incoming sheet and the pipe edge. This is because an increase in diameter is desired and, in either case, an increase in diameter results. Once the offset exceeds the revised offset value, the controller attempts to open the weld gap by commanding a decrease in the helix angle and commanding a decrease in the height of the auxiliary hold down wheel. As soon as a weld gap begins to form the offset becomes totally due to the position of the auxiliary hold down wheel. If the offset is too low, the auxiliary hold down wheel position is commanded to rise by the controller. As the helix angle is not commanded to change as a result of the offset being less than the revised offset value, the control of the helix angle and the control of the auxiliary hold down wheel position do not result in an unstable system process and a steady state is eventually achieved. However, to avoid system overshoot the rate of change of the auxiliary hold down wheel position should not be excessive. Other approaches include inhibiting changes in the auxiliary hold down wheel position unless a measurable weld gap exists or by having multiple response rates for auxiliary hold down wheel positioning. This includes allowing the auxiliary hold down wheel to move rapidly when a weld gap is present, or only allowing the auxiliary hold down wheel to move at a slow rate when an increase in the auxiliary hold down wheel height is desired.

If the current pipe diameter is too large, the incoming sheet has no camber, and the sheet width is constant, the controller calculates a revised offset value that is less than the current offset. As long as no weld gap exists, the controller commands a decrease in helix angle and commands a decrease in auxiliary hold down wheel position.

When the current diameter is correct, the incoming sheet has no camber, but the sheet width is increasing, the incoming sheet leading edge and the pipe edge will abut with excess pressure. This will cause the leading edge of the incoming sheet to climb with respect to the pipe edge, resulting in the offset being greater than the revised offset value. The controller therefore commands a decrease in the helix angle to open the gap. This response will maintain the correct diameter. If, however, the sheet width is instead decreasing, the controller commands an increase in the helix angle to close the weld gap forming due to the decrease in sheet width.

In the case of camber in the incoming sheet, the pipe must be welded together as a series of helical cones due to one edge of the sheet being longer than the other edge. Therefore, to maintain constant average diameter, there must be a continual weld offset to form the helical cones. To avoid a weld gap and to remain the correct pipe diameter, the tangent to the camber at the weld point must be the helix angle otherwise required for the correct pipe diameter. Using a camber in the direction away from the outgoing pipe as an example, the camber will cause a weld gap to form. Once a weld gap forms, the controller commands an adjustment in the helix angle to close the weld gap. The trailing edge of the sheet, however, causes a cone to form. The cone results in a decrease in pipe diameter. The decrease in pipe diameter results, as discussed above, in an increase in the revised offset value and in raising the auxiliary hold down wheel. The results of this interaction between incoming camber and system response is to produce a series of helical cones. This is the desired response as the incoming camber is consumed while the average pipe diameter is maintained.

Thus, the diameter control of the present invention provides a method of controlling pipe diameter using simple logic, and solves problems due to camber and sheet width changes associated with standard mill produced skelp. Although this invention has been described in certain specific embodiments, many additional modifications and variations will be apparent to those skilled in the art. It is therefore to be understood that this invention may be practiced otherwise than is specifically described. Thus, the present embodiments of the invention should be considered in all respects as illustrative and not restrictive, the scope of the invention to be indicated by the following claims rather than the foregoing description.

I claim:

1. Apparatus for diameter control of a pipe formed by helically welding a sheet comprising:
   diameter measuring transducers on the pipe downstream from a welding location;
   offset control means for controlling offset of a leading edge of an incoming sheet to the welding location relative to an edge of the pipe at the welding location; and
   a servo control linking the transducers and the offset control means for holding the offset at a selected point.

2. The apparatus for diameter control of a pipe formed by helically welding a sheet of claim 1 further comprising:
   weld gap measuring means for measuring a weld gap approximate the welding location;
   angle control means for controlling the angular relationship of the incoming sheet relative to the axis of the pipe; and
   a second servo control linking the weld gap measuring means and the angle control means.

3. The apparatus for diameter control of a pipe formed by helically welding a sheet of claim 2 wherein the weld gap measuring means additionally measures the offset of the leading edge of the incoming sheet relative to the edge of the pipe approximate the welding location.

4. The apparatus for diameter control of a pipe formed by helically welding a sheet of claim 3 wherein the first servo control and the second servo control are contained within a single servo control.

5. A method for diameter control of a pipe formed by helically welding a sheet comprising the steps of:
   measuring the diameter of the pipe; and
   adjusting radial offset of a leading edge of an incoming sheet to a welding location relative to an edge of the pipe at the welding location to maintain the pipe at a selected diameter.

6. The method of claim 5 further comprising the steps of:
   measuring a gap between the leading edge of the incoming sheet and the edge of the pipe approximate the welding location; and
   changing the angular relationship of the incoming sheet relative to the axis of the pipe to minimize the gap.

7. The method of claim 6 wherein the radial offset of the leading edge relative to the edge of the pipe is increased if the diameter of the pipe is less than the selected diameter.

8. The method of claim 6 wherein the radial offset of the leading edge relative to the edge of the pipe is decreased if the diameter of the pipe is greater than the selected diameter.

9. The method of claims 7 or 8 wherein the radial offset is adjusted at a first rate when a gap greater than a defined magnitude is measured between the leading edge of the incoming sheet and the edge of the pipe approximate the welding location and at a second rate when a gap less than or equal to the defined magnitude is measured between the leading edge of the incoming sheet and the edge of the pipe approximate the welding location.

10. The method of claim 9 wherein the first rate is greater than the second rate.

11. Apparatus for diameter control of a pipe formed by helically welding a sheet comprising:
    diameter measuring transducers on the pipe downstream from a welding location;
    a movable guide roller for guiding an incoming sheet with a leading edge to the welding location;
    measuring means for measuring a radial offset between the leading edge and the pipe approximate the welding location; and
    a controller coupled to the transducers, the measuring means, and the guide roller, the controller moving the guide roller to maintain the pipe at a selected diameter.

12. The apparatus for diameter control of a pipe formed by helically welding a sheet of claim 11 further comprising angle control means for controlling the angular relationship of the incoming sheet relative to the axis of the pipe, the angle control means being coupled to the controller.

13. The apparatus for diameter control of a pipe formed by helically welding a sheet of claim 12 wherein the measuring means additionally measures the gap between the leading edge and the pipe approximate the welding location.

14. The apparatus for diameter control of a pipe formed by helically welding a sheet of claim 13 wherein the controller commands the movable guide roller to a position which results in increased radial offset when the pipe diameter as measured by the transducers is less than the selected diameter.

15. The apparatus for diameter control of a pipe formed by helically welding a sheet of claim 14 wherein the controller commands the movable guide roller to a position which results in decreased radial offset when the pipe diameter as measured by the transducers is greater than the selected diameter.

16. The apparatus for diameter control of a pipe formed by helically welding a sheet of claims 14 or 15 wherein the controller commands the movable guide roller to the position at a first rate when the measuring means measures a gap greater than a defined magnitude between the leading edge and the pipe and at a second rate when the measuring means measures a gap less than or equal to the defined magnitude between the leading edge and the pipe.

17. The apparatus for diameter control of a pipe formed by helically welding a sheet of claim 15 wherein the controller commands the angle control means to change the angular relationship of the incoming sheet relative to the axis of the pipe when the radial offset as measured by the measuring means is greater than a selected radial offset.

18. The apparatus for diameter control of a pipe formed by helically welding a sheet of claim 17 wherein the controller commands the angle control means to change the angular relationship of the incoming sheet relative to the axis of the pipe when a gap exists between the leading edge of the incoming sheet and the pipe as measured by the measuring means.

* * * * *